US012754509B2

(12) United States Patent
Maenishi

(10) Patent No.: US 12,754,509 B2
(45) Date of Patent: Oct. 6, 2026

(54) SHEET CARRIER DEVICE AND IMAGE FORMING SYSTEM FOR DETERMINING WHETHER THERE IS SHEET LOCATED AT TEARING JAM PLACE WHEN JAM OCCURS

(71) Applicant: KYOCERA Document Solutions Inc., Osaka (JP)

(72) Inventor: Junta Maenishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/185,628

(22) Filed: Apr. 22, 2025

(65) Prior Publication Data

US 2025/0334918 A1 Oct. 30, 2025

(30) Foreign Application Priority Data

Apr. 24, 2024 (JP) ................................ 2024-070943

(51) Int. Cl.
*G03G 15/00* (2006.01)

(52) U.S. Cl.
CPC ......... *G03G 15/70* (2013.01); *G03G 15/5029* (2013.01); *G03G 15/6529* (2013.01); *G03G 15/6552* (2013.01); *G03G 2215/00552* (2013.01)

(58) Field of Classification Search
CPC ............... G03G 15/70; G03G 15/5029; G03G 15/6529; G03G 15/6552; G03G 2215/00552
See application file for complete search history.

(56) References Cited

U.S. PATENT DOCUMENTS

| | | | | |
|---|---|---|---|---|
| 2014/0167580 A1* | 6/2014 | Funayama | E05B 47/023 271/265.04 |
| 2014/0169828 A1 | 6/2014 | Ohta | |
| 2016/0318728 A1* | 11/2016 | Kowase | B65H 43/00 |
| 2016/0376116 A1* | 12/2016 | Suzuki | B65H 1/04 271/262 |
| 2017/0227912 A1* | 8/2017 | Iino | G03G 15/70 |
| 2020/0310325 A1* | 10/2020 | Murata | G03G 15/502 |
| 2021/0286308 A1* | 9/2021 | Ishikawa | G03G 15/70 |

FOREIGN PATENT DOCUMENTS

| | | |
|---|---|---|
| JP | 2003280303 A | 10/2003 |
| JP | 2014134753 A | 7/2014 |
| JP | 5696070 B2 | 4/2015 |

* cited by examiner

*Primary Examiner* — David H Banh
(74) *Attorney, Agent, or Firm* — IP Business Solutions, LLC.

(57) ABSTRACT

A sheet carrier device includes a sheet carrying passage, roller pairs, a sheet detection device, and a control device. The sheet carrying passage includes a part configured as a drawable drawer device. The roller pairs carry a sheet along the sheet carrying passage. The sheet detection device detects whether there is the sheet which is being carried along the sheet carrying passage. The control device determines whether there is the sheet located in a tearing jam place between the inside and the outside of the drawer device at a time point at which a jam occurs on the basis of a result of detection from the sheet detection device and performs a tearing jam releasing process of removing the sheet from the tearing jam place when it is determined that there is the sheet.

6 Claims, 7 Drawing Sheets

SHEET CARRIER DEVICE AND IMAGE FORMING SYSTEM FOR DETERMINING WHETHER THERE IS SHEET LOCATED AT TEARING JAM PLACE WHEN JAM OCCURS

INCORPORATION BY REFERENCE This application claims priority to Japanese Patent Application No. 2024-070943 filed on 24 Apr. 2024, the entire contents of which are incorporated by reference herein.

BACKGROUND

The present disclosure relates to a sheet carrier device and an image forming system and more particularly to a technique of determining whether there is a sheet located at a tearing jam place and removing the sheet from the tearing jam place.

An image forming apparatus configured such that a part of a sheet carrying passage is able to be externally drawn out is known. The image forming apparatus, when a sheet jam (hereinafter referred to as a "jam") occurs, a user releases the jam by drawing out the part of the sheet carrying passage and removing a sheet on the sheet carrying passage.

The image forming apparatus, when a jam occurs, a sheet may be suspended and stopped between a drawable part of the sheet carrying passage and a non-drawable part of the sheet carrying passage. In this case, when a user draws out the drawable part of the sheet carrying passage, there is a problem in that a tearing jam in which a sheet is torn occurs.

In order to solve this problem, a first technique of carrying a sheet left on the sheet carrying passage to a shelter part, for example, when a jam occurs and it is detected that there is a sheet suspended between the drawable part of the sheet carrying passage and the non-drawable part of the sheet carrying passage is known. A second technique of locking a drawer device to an apparatus body when it is detected that there is a sheet suspended between a carrying passage of the image forming apparatus body and a carrying passage of the drawer device is also known.

SUMMARY

An aspect of the present disclosure proposes an improvement of the aforementioned techniques.

A sheet carrier device according to an aspect of the present disclosure includes a sheet carrying passage, roller pairs, a sheet detection device, and a control device. The sheet carrying passage includes a part configured as a drawable drawer device. The roller pairs carry a sheet along the sheet carrying passage. The sheet detection device detects whether there is the sheet which is being carried along the sheet carrying passage. The control device includes a processor and, by causing the processor to execute a control program, determines whether there is the sheet located in a tearing jam place between the inside and the outside of the drawer device at a time point at which a jam occurs on the basis of a result of detection from the sheet detection device and performs a tearing jam releasing process of removing the sheet from the tearing jam place when it is determined that there is the sheet.

An image forming system according to another aspect of the present disclosure includes an image forming apparatus, a post-processing apparatus, and the sheet carrying device. The image forming apparatus forms an image on a sheet. The post-processing apparatus performs a post-process on the sheet. The sheet carrier device receives the sheet from the image forming apparatus and carries the sheet to the post-processing apparatus.

DETAILED DESCRIPTION

Configuration of Image Forming System 1

Hereinafter, an image forming system 1 according to an embodiment of the present disclosure will be described with reference to the accompanying drawings.

Figure 1:
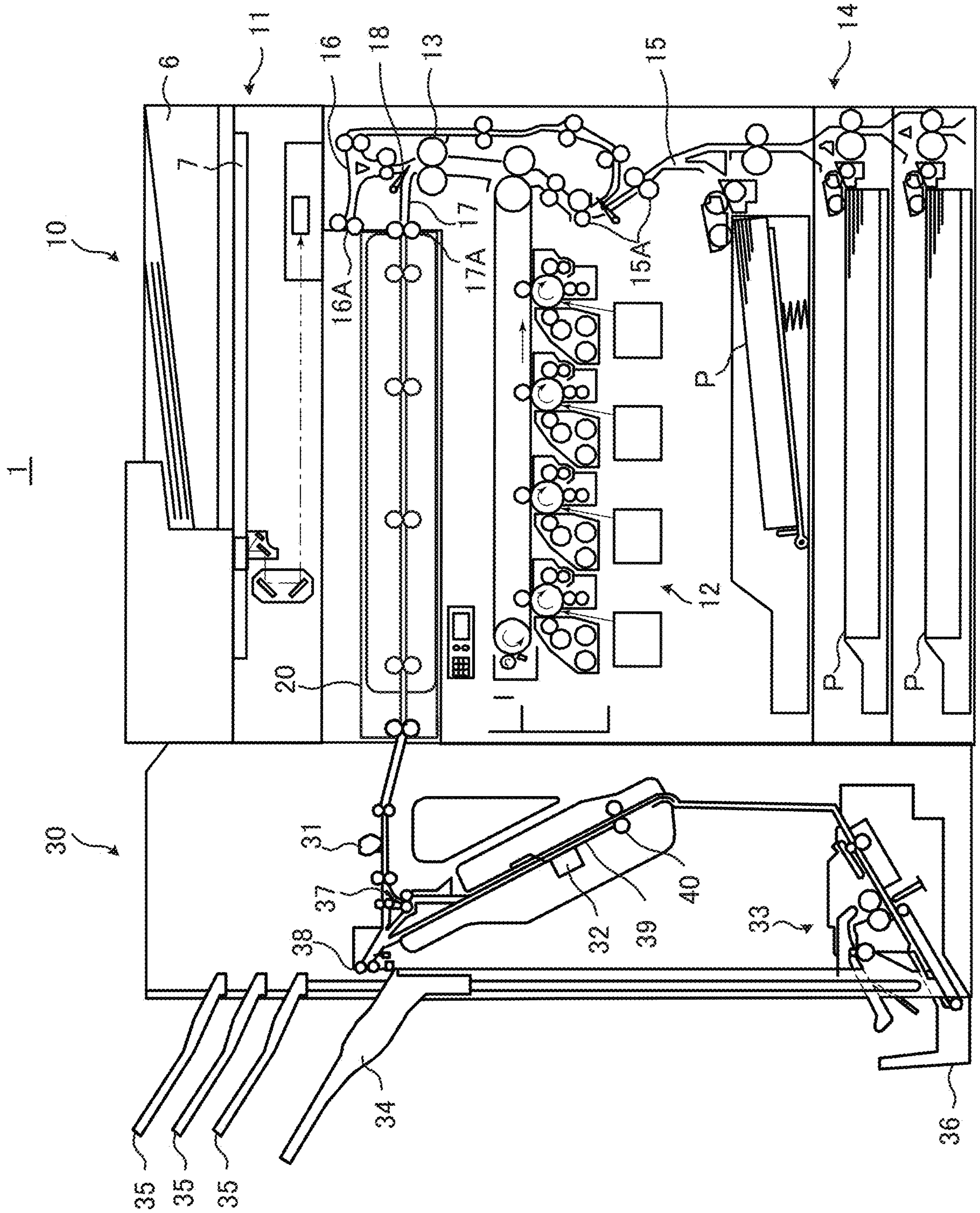
FIG. 1 is a sectional front view illustrating a configuration of an image forming system.

FIG. 1 is a sectional front view illustrating a configuration of an image forming system 1 according to an embodiment of the present disclosure. Referring to FIG. 1, the image forming system 1 includes an image forming apparatus 10, a relay device 20, and a post-processing apparatus 30. The image forming apparatus 10 forms an image on a sheet P. The relay device 20 receives the sheet P from the image forming apparatus 10 and relays and carries the sheet P to the post-processing apparatus 30. The post-processing apparatus 30 receives the sheet P from the relay device 20 and performs a post-process on the sheet P.

Configuration of Image Forming Apparatus

The image forming apparatus 10 is an inner sheet discharge type digital multifunction machine. The image forming apparatus 10 includes an image reading device 11, an image forming device 12, a fixing device 13, and a sheet supply device 14 in a housing. A carrying passage 15 extending from the sheet supply device 14 via the image forming device 12 and the fixing device 13 is formed in the housing of the image forming apparatus 10.

The image reading device 11 includes an original carrying device 6 carrying an original placed on an original platen. The image reading device 11 optically reads an image of an original carried by the original carrying device 6 or an original placed on a platen glass 7 and generates image data.

The image forming device 12 includes a photosensitive drum, a charging device, an exposure device, a developing device, and a transfer device. The image forming device 12 forms a toner image based on image data on a sheet P through an electrophotographic process.

The fixing device 13 fixes the toner image onto the sheet P by heating and pressurizing the sheet P on which the toner image is formed. Accordingly, an image is formed on the sheet P.

The sheet supply device 14 includes a plurality of sheet supply cassettes. The sheet supply device 14 picks up sheets P stored in one of the plurality of sheet supply cassettes sheet by sheet using a pickup roller and supplies the picked-up sheet to the carrying passage 15.

A carrier roller pair 15A is provided at an appropriate position of the carrying passage 15. The carrier roller pair 15A carries a sheet P along the carrying passage 15. The carrying passage 15 branches into a first carrying passage 16 and a second carrying passage 17 downstream in a sheet carrying direction from the fixing device 13.

The first carrying passage 16 is formed to extend from a branching point to a discharge port. The second carrying passage 17 is formed to extend from the branching point to a connection part between the image forming apparatus 10 and the relay device 20.

A switching claw 18 is provided at the branching point into the first carrying passage 16 and the second carrying passage 17. The switching claw 18 switches a carrying direction of a sheet P to one of the first carrying passage 16 and the second carrying passage 17 by switching a posture thereof under the control of a controller 110 which will be described later.

A first discharge roller pair 16A is provided at a downstream end in the sheet carrying direction of the first carrying passage 16. The first discharge roller pair 16A discharges a sheet P guided to the first carrying passage 16 by the switching claw 18 to the outside of the image forming apparatus 10.

A second discharge roller pair 17A is provided at a downstream end in the sheet carrying direction of the second carrying passage 17. The second discharge roller pair 17A discharges a sheet P guided to the second carrying passage 17 by the switching claw 18 to the relay device 20.

Configuration of Relay Device 20

An inner sheet discharge space is provided in the image forming apparatus 10. The relay device 20 is provided in the inner sheet discharge space. The top surface of a housing of the relay device 20 serves as a discharge tray on which a sheet P discharged by the first discharge roller pair 16A is stacked.

Figure 2:
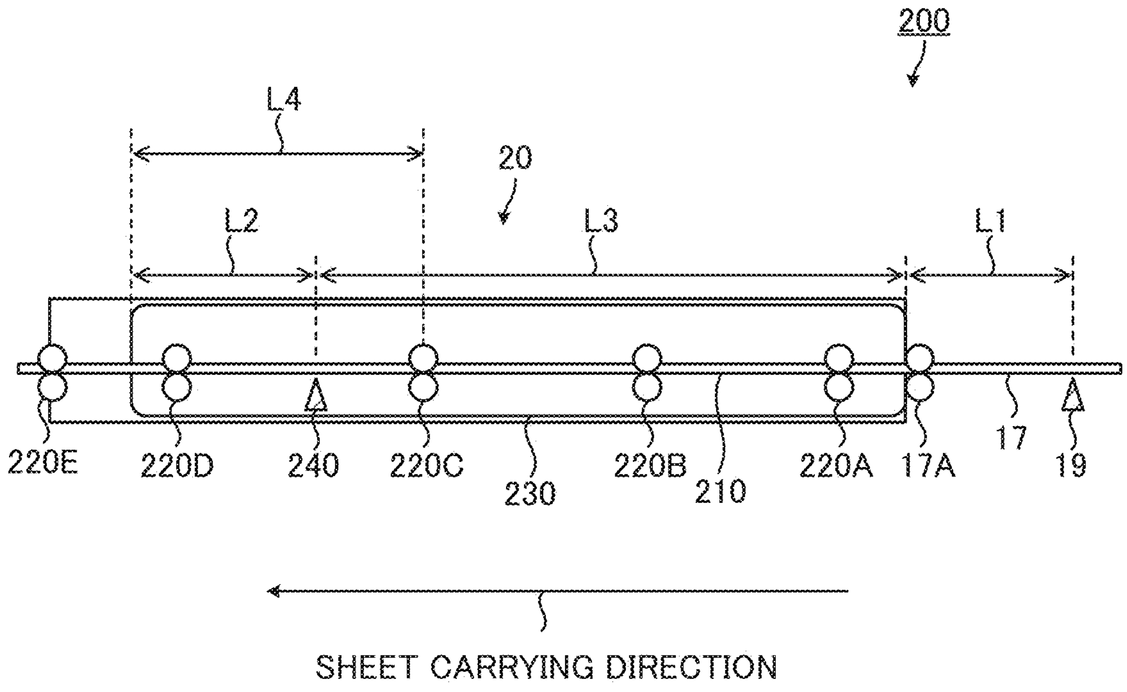
FIG. 2 is a diagram schematically illustrating a configuration of a relay device.

FIG. 2 is a diagram schematically illustrating a configuration of the relay device 20. Referring to FIG. 2, the relay device 20 includes a relay carrying passage 210 and bridge roller pairs 220A to 220E. The relay carrying passage 210 is formed to extend from a connection part between the image forming apparatus 10 and the relay device 20 to a connection part between the post-processing apparatus 30 and the relay device 20.

The bridge roller pairs 220A to 220E carry a sheet P along the relay carrying passage 210. The bridge roller pairs 220A to 220E are arranged in this order from upstream to downstream in the sheet carrying direction.

The second discharge roller pair 17A and the bridge roller pairs 220A and 220B are upstream roller pairs that are provided upstream in the sheet carrying direction, and driving thereof is controlled in conjunction with each other in a tearing jam releasing process which will be described later. The bridge roller pairs 220C, 220D, and 220E are downstream roller pairs that are provided downstream in the sheet carrying direction, and driving thereof is controlled in conjunction with each other in a tearing jam releasing process which will be described later.

The second carrying passage 17 and the relay carrying passage 210 serve as a sheet carrying passage for carrying a sheet P from the image forming apparatus 10 to the post-processing apparatus 30. A part of the relay carrying passage 210 is configured as a drawer device 230 that is drawable to the front side (the near side in the drawing). The bridge roller pairs 220A to 220D are provided in the drawer device 230.

In the vicinity of the second discharge roller pair 17A, a discharge sensor 19 is provided upstream in the sheet carrying direction from the second discharge roller pair 17A. A bridge sensor 240 is provided between the bridge roller pair 220C and the bridge roller pair 220D.

The discharge sensor 19 and the bridge sensor 240 are photo-sensors that detect whether there is a sheet P which is being carried along the sheet carrying passage and include a light emitting portion and a light receiving portion which are provided to face each other. The discharge sensor 19 and the bridge sensor 240 output an OFF signal when a sheet P is detected and output an ON signal when a sheet P is not detected.

The discharge sensor 19 and the bridge sensor 240 are not limited to photo-sensors. The discharge sensor 19 and the bridge sensor 240 are not particularly limited as long as they are sensors that can detect whether there is a sheet P and may be, for example, mechanical sensors having a configuration for physically detecting contact with a sheet P.

The relay device 20, the discharge sensor 19, the second discharge roller pair 17A, and the second carrying passage 17 constitute a sheet carrier device 200 in the claims.

Configuration of Post-Processing Apparatus 30

The post-processing apparatus 30 includes a punching device 31, a stapling device 32, a sheet folding device 33, a main bin 34, a plurality of sub bins 35, a discharge tray 36, a branching guide 37, a discharge roller pair 38, a sheet receiving tray 39, and a carrying roller pair 40. The main bin 34 and the sub bins 35 are moved up and down to a position corresponding to the discharge roller pair 38 by a lifting mechanism.

The punching device 31 performs a punching process on a sheet P carried from the relay device 20. The sheet P on which the punching process has been performed is guided to the discharge roller pair 38 and the sheet receiving tray 39 by the branching guide 37. The discharge roller pair 38 discharges the sheet P to one of the main bin 34 and the plurality of sub bins 35.

The stapling device 32 performs a stapling process a bundle of sheets P guided and stocked on the sheet receiving tray 39. The bundle of sheets P on which the stapling process has been performed is discharged to one of the main bin 34 and the plurality of sub bins 35 by the discharge roller pair 38 or carried to the sheet folding device 33 by the carrying roller pair 40.

The sheet folding device 33 performs a sheet folding process of folding a bundle of sheets P carried by the carrying roller pair 40 at the center thereof. The bundle of sheets P on which the sheet folding process has been performed is discharged to the discharge tray 36.

Configuration Associated With Control of Image Forming System 1

Figure 3:
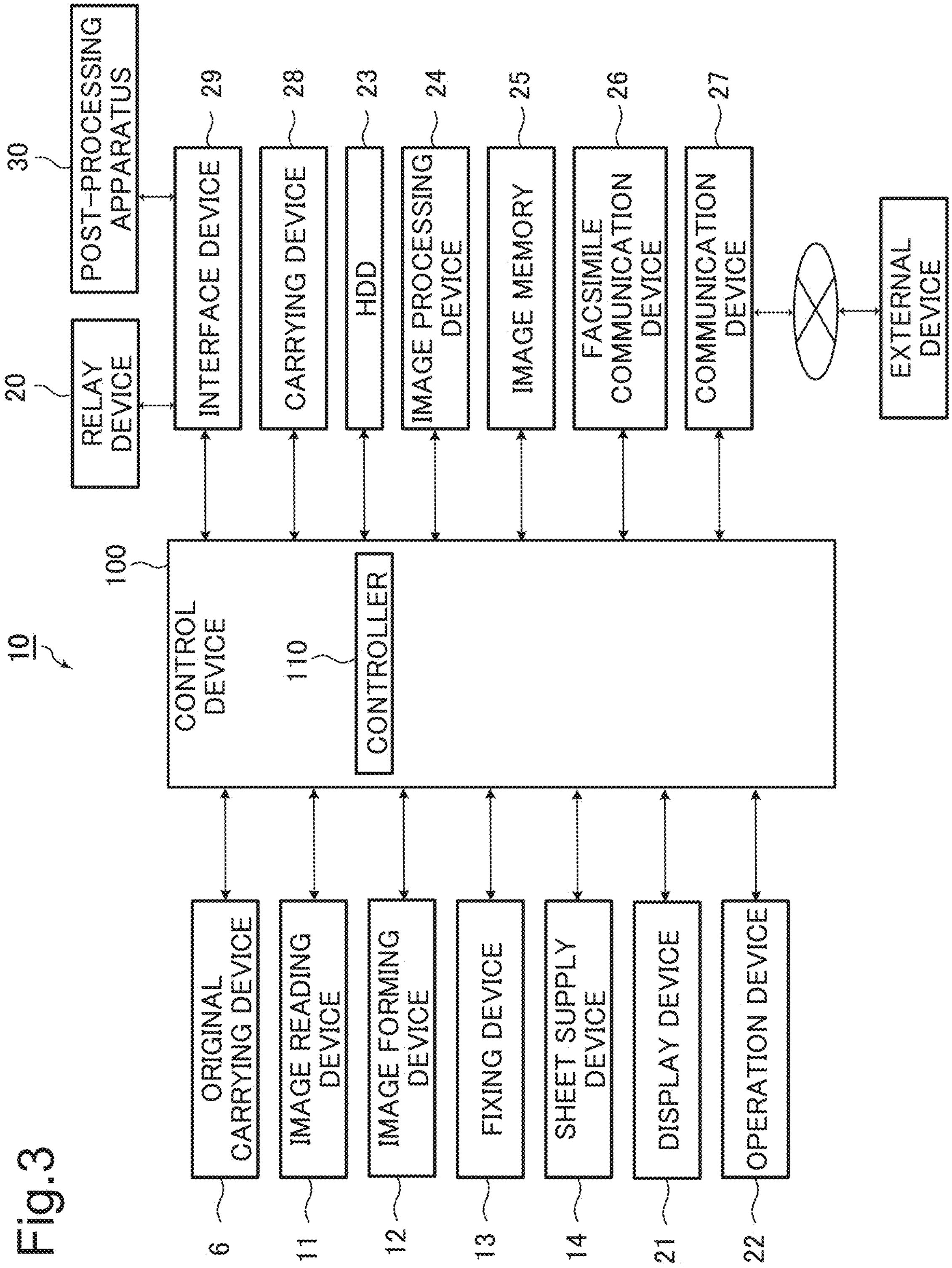
FIG. 3 is a functional block diagram illustrating a principal internal configuration of an image forming apparatus.

FIG. 3 is a functional block diagram illustrating a principal internal configuration of the image forming apparatus 10. Referring to FIG. 3, the image forming apparatus 10 further includes a display device 21, an operation device 22, a hard disk drive (HDD) 23, an image processing device 24, an image memory 25, a facsimile communication device 26, a communication device 27, a carrier device 28, an interface device 29, and a control device 100.

The display device 21 is a display device including a liquid crystal display or an organic light-emitting diode (EL) display. The display device 21 displays various screens.

The operation device 22 includes a plurality of hardware keys including a start key for inputting an execution start instruction of processes which can be performed by the image forming apparatus 10. The operation device 22 includes a touch panel that is provided to overlap the display device 21. A user's instruction is input to the operation device 22.

The HDD 23 is a large-capacity storage device for storing various types of data such as image data. The HDD 23 stores various control programs for realizing regular operations of the image forming apparatus 10. The HDD 23 stores a release program for performing a tearing jam releasing process which will be described later as a part of the various control programs.

The image processing device 24 performs image processing on image data generated by the image reading device 11 according to necessity. The image memory 25 includes an area that temporarily stores image data generated by the image reading device 11. The facsimile communication device 26 performs transmission and reception of image data via a public line.

The communication device 27 includes a communication module such as a local area network (LAN) board. The communication device 27 performs data communication with an external device such as a personal computer (PC) via a network.

The carrier device 28 includes a carrier roller pair 15A, a first discharge roller pair 16A, a second discharge roller pair 17A, and a carrier motor. The carrier roller pair 15A, the first discharge roller pair 16A, the second discharge roller pair 17A, and the like are rotationally driven with driving of the carrier motor.

The interface device 29 is electrically connected to the relay device 20 and the post-processing apparatus 30. The interface device 29 includes a plurality of terminals for electrical connection to the relay device 20 and the post-processing apparatus 30.

The control device 100 includes a processor, a random access memory (RAM), and a read only memory (ROM). The processor is, for example, a central processing unit (CPU), a micro processing unit (MPU), or an application-specific integrated circuit (ASIC).

The control device 100 is electrically connected to the original carrying device 6, the image reading device 11, the image forming device 12, the fixing device 13, the sheet supply device 14, the display device 21, the operation device 22, the HDD 23, the image processing device 24, the image memory 25, the facsimile communication device 26, the communication device 27, the carrier device 28, the interface device 29, and the like.

The control device 100 serves as a controller 110 by causing the processor to execute a control program stored in the ROM or the HDD 23. The controller 110 may be constituted by a logical circuit regardless of an operation based on the control program.

The controller 110 controls the image forming apparatus 10 as a whole. That is, the controller 110 controls operations of the constituents of the image forming apparatus 10. The controller 110 controls operations of the constituents of the relay device 20 and the post-processing apparatus 30 via the interface device 29.

A power supply is connected to the constituents of the image forming apparatus 10, and the constituents of the image forming apparatus 10 operates with electric power supplied from the power supply.

In the image forming system 1 having this configuration, for example, when a user inputs an instruction for starting execution of a copying process and a post-process to the operation device 22, the controller 110 causes the image reading device 11 to read an image of an original and controls the operations of the sheet supply device 14, the carrier roller pair 15A, the image forming device 12, and the fixing device 13 such that the image of the original is formed on a sheet P.

The controller 110 causes the switching claw 18 to guide the sheet P on which the image of the original is formed to the second carrying passage 17 and rotationally drives the second discharge roller pair 17A and the bridge roller pairs 220A to 220E to carry the sheet P to the post-processing apparatus 30 via the relay carrying passage 210. The controller 110 controls the operations of the constituents of the post-processing apparatus 30 such that post-processes such as the punching process, the stapling process, and the sheet folding process are performed on the sheet P carried to the post-processing apparatus 30.

For example, when a post-process does not have to be performed such as when an execution starting instruction of only the copying process is input to the operation device 22 by the user, the controller 110 causes the switching claw 18 to guide the sheet P on which the image of the original is formed to the first carrying passage 16 and rotationally drives the first discharge roller pair 16A to discharge the sheet P to the top surface of the housing of the relay device 20.

Tearing Jam Releasing Process

Figure 4:
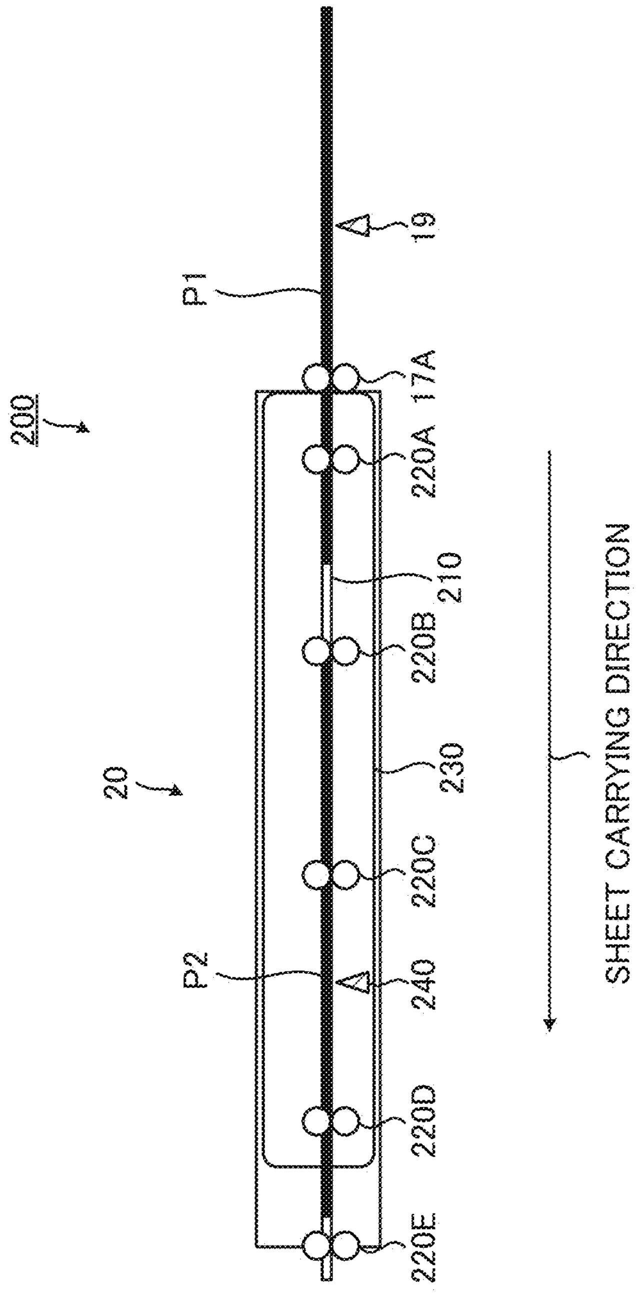
FIG. 4 is a diagram illustrating a state in which two sheets are located in tearing jam places between the inside and the outside of a drawer device.

FIG. 4 is a diagram illustrating a state in which two sheets P are located in tearing jam places between the inside and the outside of the drawer device 230. In the following description, a sheet P suspended between an upstream end in the sheet carrying direction of the drawer device 230 and the outside of the drawer device 230 is referred to as an "upstream sheet P1," and a sheet P suspended between a downstream end in the sheet carrying direction of the drawer device 230 and the outside of the drawer device 230 is referred to as a "downstream sheet P2."

When a user draws out the drawer device 230 to the near side (in a direction perpendicular to the sheet carrying direction) in a state in which the upstream sheet P1 and the downstream sheet P2 are located in the tearing jam places of the drawer device 230 as illustrated in FIG. 4, a tearing jam in which the upstream sheet P1 and the downstream sheet P2 are torn occurs.

In order to prevent occurrence of such a tearing jam, according to the present embodiment, the controller 110 operates in accordance with the release program to determine whether there is a sheet P located in a tearing jam place between the inside and the outside of the drawer device 230 at a time point at which the jam occurs on the basis of a results of detection from the discharge sensor 19 and the bridge sensor 240 and to perform a tearing jam releasing process for removing the sheet P from the tearing jam place when it is determined that there is the sheet P.

Operations

Figure 5:
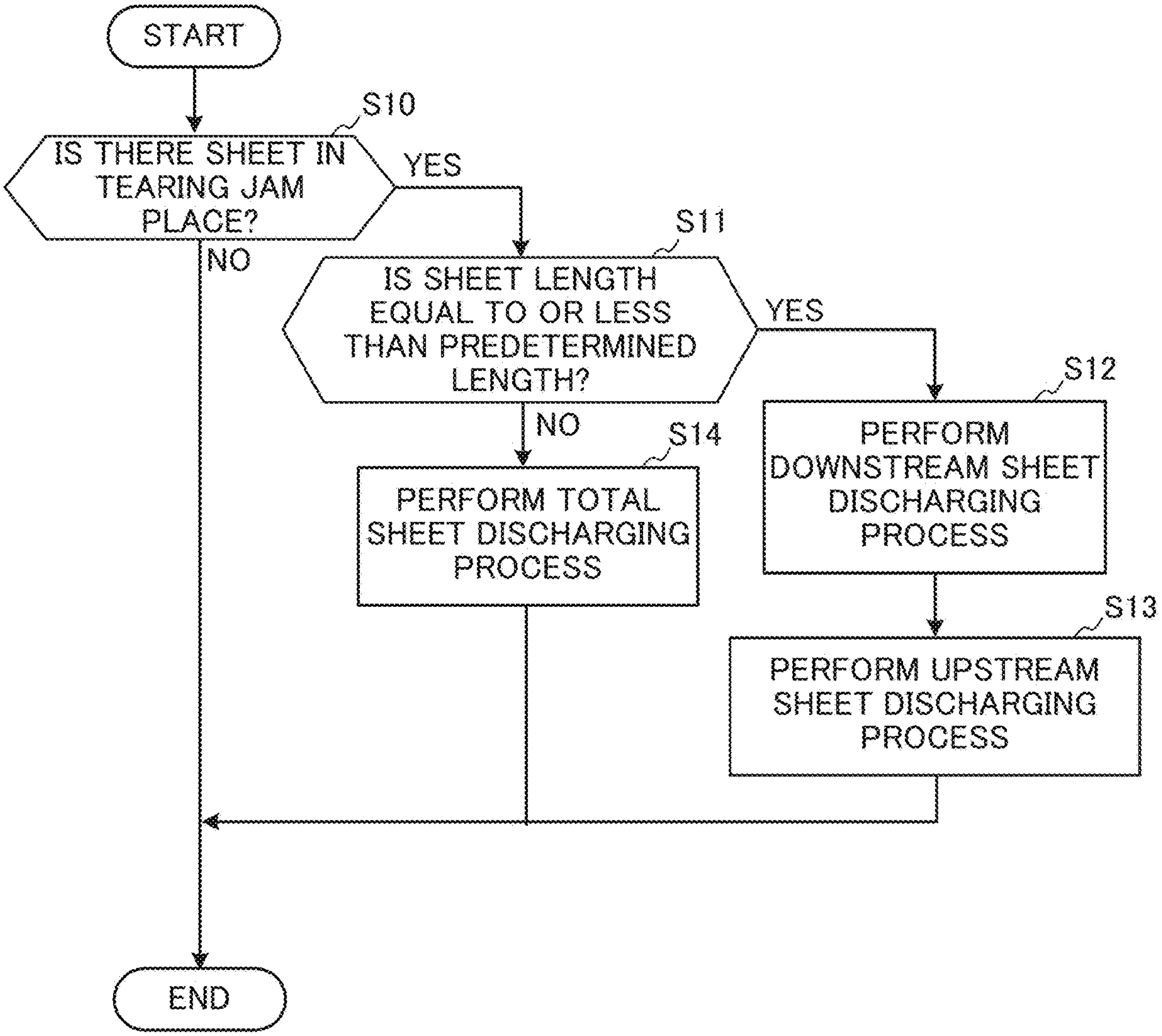
FIG. 5 is a flowchart illustrating a tearing jam releasing process.

FIG. 5 is a flowchart illustrating the tearing jam releasing process. The operations of the image forming system 1 at the time of performing of the tearing jam releasing process will be described below with reference to FIG. 5 or the like.

For example, when the execution starting instructions of the copying process and the post-process are received via the operation device 22, the controller 110 monitors whether a jam occurs in the relay device 20. For example, when a jam of a sheet P is detected because the bridge sensor 240 has not output an OFF signal within a predetermined time after the discharge sensor 19 has output an OFF signal, the controller 110 starts execution of the tearing jam releasing process.

When execution of the tearing jam releasing process is started, first, the controller 110 determines whether there is a sheet P located in a tearing jam place between the inside and the outside of the drawer device 230 on the basis of the results of detection from the discharge sensor 19 and the bridge sensor 240 (Step S10).

In Step S10, first, the controller 110 determines whether there is an upstream sheet P1 at a time point at which a jam occurs. Specifically, the controller 110 measures a first elapsed time from a time point at which the discharge sensor 19 has output an OFF signal. The controller 110 calculates a distance between a front end in the sheet carrying direction of the sheet P for which an OFF signal has been output by the discharge sensor 19 and the discharge sensor 19 at the time point at which the jam has been detected on the basis of the first elapsed time from the time point at which a jam has been detected and a predetermined carrying speed of the sheet P.

When the calculated distance is greater than a distance LI from the discharge sensor 19 to the upstream end in the sheet carrying direction of the drawer device 230, the controller 110 determines that a front end in the sheet carrying direction of the sheet P is located inside of the drawer device 230, that is, that an upstream sheet P1 is "present." When the calculated distance is equal to or less than the distance L1, the controller 110 determines that an upstream sheet P1 is "not present."

Subsequently, the controller 110 determines whether there is a downstream sheet P2 at the time point at which a jam occurs. Specifically, the controller 110 measures a second elapsed time from a time point at which the output of the bridge sensor 240 is switched from the OFF signal to the ON signal. The controller 110 calculates distance between a rear end in the sheet carrying direction of the sheet P for which an OFF signal and an ON signal are output from the bridge sensor 240 and the bridge sensor 240 at the time point at which a jam has been detected on the basis of the second elapsed time from the time point at which a jam has been detected and the predetermined carrying speed of the sheet P.

When the calculated distance is less than a distance L2 from the bridge sensor 240 to the downstream end in the sheet carrying direction of the drawer device 230, the controller 110 determines that a rear end in the sheet carrying direction of the sheet P is inside of the drawer device 230, that is, that the downstream sheet P2 is "present." When the calculated distance is equal to or greater than the distance L2, the controller 110 determines that an upstream sheet P2 is "not present."

When it is determined that any of the upstream sheet P1 and the downstream sheet P2 is "not present," the controller 110 determines that a sheet P located in the tearing jam place is "not present" (NO in Step S10) and ends the tearing jam releasing process.

On the other hand, when it is determined that at least one of the upstream sheet P1 and the downstream sheet P2 is "present," the controller 110 determines that a sheet P located in the tearing jam place is "present" (YES in Step S10) and determines whether the length in the sheet carrying direction of the sheet P (hereinafter referred to as a "sheet length") is equal to or less than a predetermined length (Step S11).

The predetermined length is not particularly limited as long as it is a length less than the length in the sheet carrying direction of the drawer device 230, that is, a length with which a sheet P is not located in the tearing jam place and can stay inside of the drawer device 230. In the present embodiment, it is assumed that the controller 110 sets the predetermined length to a distance L3 from an upstream end in the sheet carrying direction of the drawer device 230 to the bridge sensor 240.

(1) When Sheet Length is Equal to or Less Than Predetermined Length

When it is determined that the sheet length is equal to or less than the predetermined length (YES in Step S11), the controller 110 rotationally drives the downstream roller pairs to perform a downstream sheet discharging process for discharging the downstream sheet P2 from the inside of the drawer device 230 (Step S12).

Specifically, in Step S12, the controller 110 rotationally drives the bridge roller pairs 220C, 220D, and 220E for a time corresponding to a distance obtained by adding the sheet length to a distance L4 from the bridge roller pair 220C to the downstream end in the sheet carrying direction of the drawer device 230.

After Step S12 has been performed, the controller 110 rotationally drives the upstream roller pairs to perform an upstream sheet carrying process for carrying the upstream sheet P1 to a staying position at which the upstream sheet P1 can stay inside of the drawer device 230 without being suspended between the inside and the outside of the drawer device 230 (Step S13).

Specifically, in Step S13, the controller 110 rotationally drives the second discharge roller pair 17A and the bridge roller pairs 220A and 220B until the bridge sensor 240 outputs an OFF signal. After Step S13 has been performed, the controller 110 ends the tearing jam releasing process.

Figure 6:
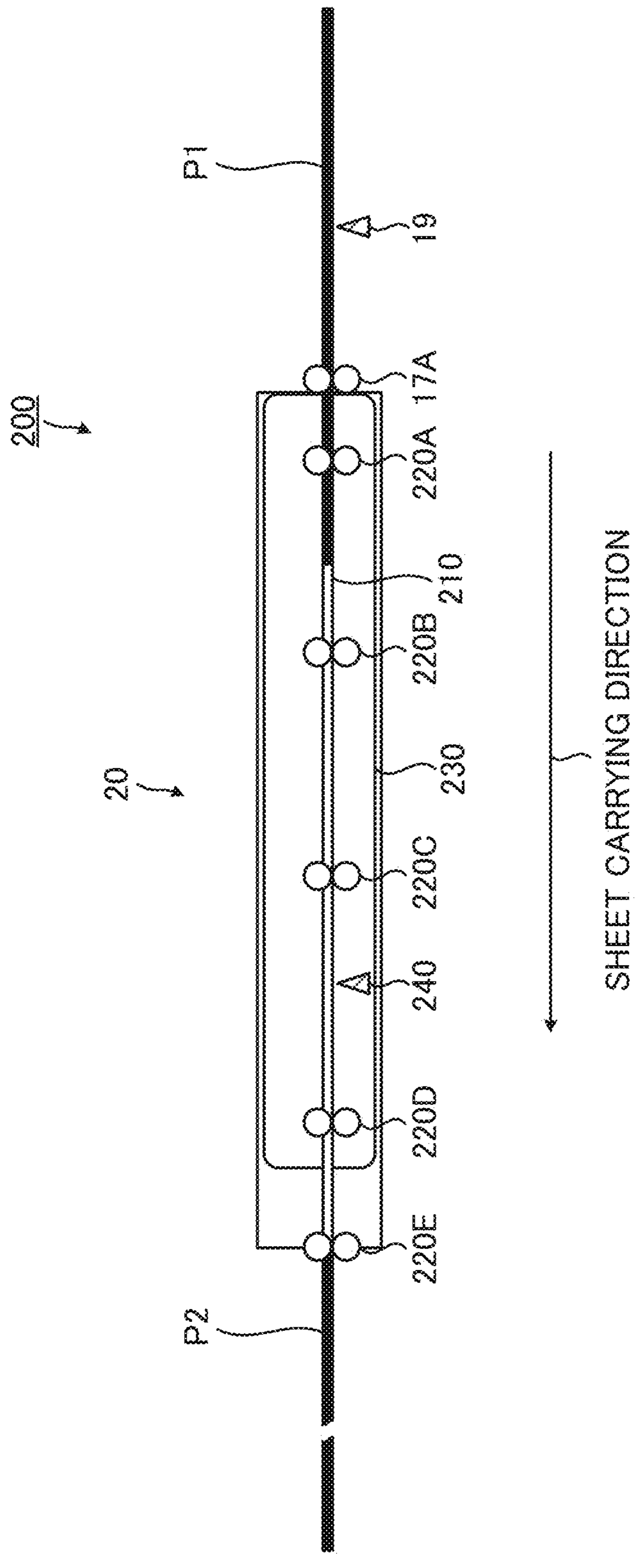
FIG. 6 is a diagram illustrating a state in which a downstream sheet is discharged from the inside of the drawer device.

For example, when the controller 110 performs the process of Step S12 in a state in which the downstream sheet P2 and the upstream sheet P1 are located in the tearing jam places of the drawer device 230 as illustrated in FIG. 4, the downstream sheet P2 is completely discharged from the inside of the drawer device 230 as illustrated in FIG. 6. Accordingly, it is possible to reliably prevent a tearing jam of the downstream sheet P2 from occurring with drawing-out of the drawer device 230.

Figure 7:
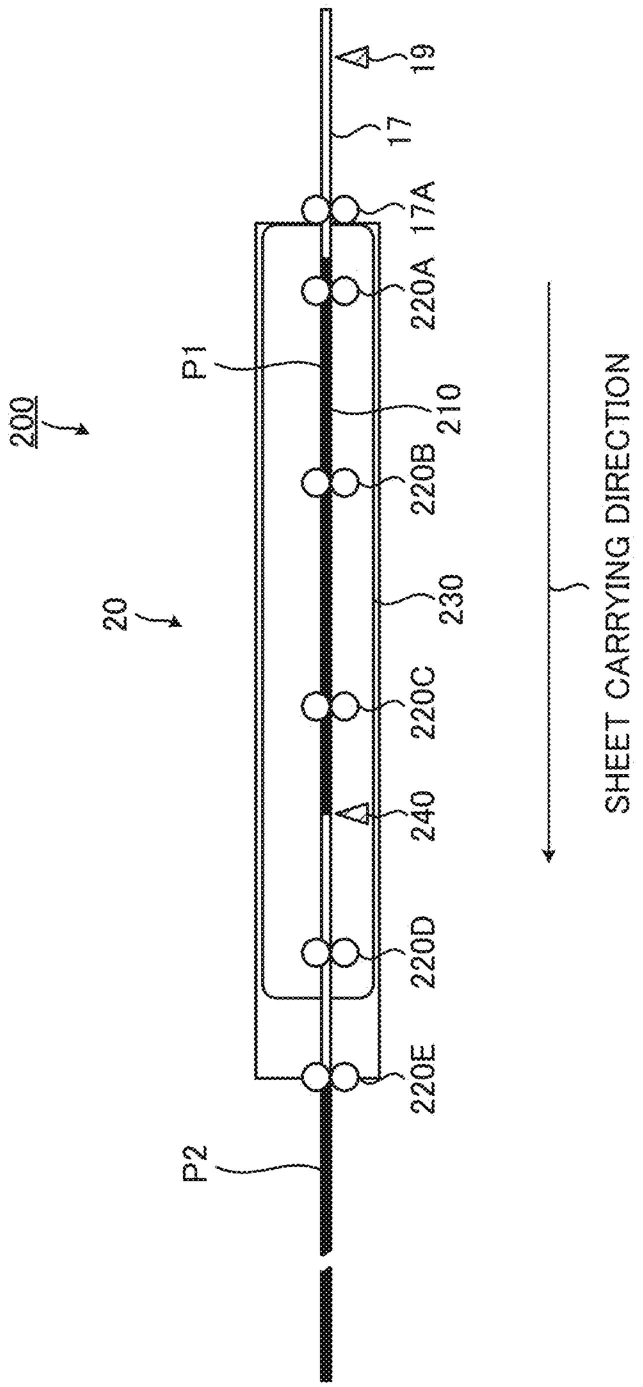
FIG. 7 is a diagram illustrating a state in which an upstream sheet is not located in a tearing jam place but stays in the drawer device.

When the controller 110 performs the process of Step S13, the upstream sheet P1 stays inside of the drawer device 230 without being suspended between the inside and the outside of the drawer device 230 as illustrated in FIG. 7. Accordingly, it is possible to reliably prevent a tearing jam of the upstream sheet P1 from occurring with drawing-out of the drawer device 230. A user can easily remove the upstream sheet PI by drawing out the drawer device 230.

Since the upstream sheet P1 is carried to the staying position, it is possible to shorten a driving time of the upstream roller pairs in comparison with a case in which the upstream sheet P1 is carried until the upstream sheet P1 is discharged from the inside of the drawer device 230. As a result, it is possible to lower a likelihood that a tearing jam will occur because a user draws out the drawer device 230 while carrying the upstream sheet P1.

(2) When Sheet Length is Greater Than Predetermined Length

When it is determined that the sheet length is greater than the predetermined length (NO in Step S11), the controller 110 rotationally drives the downstream roller pairs and the upstream roller pairs to perform a total sheet discharging process for discharging all sheets (the upstream sheet P1 and the downstream sheet P2 in this case) staying inside of the drawer device 230 from the inside of the drawer device 230 (Step S14).

Specifically, in Step S14, the controller 110 rotationally drives the second discharge roller pair 17A and the bridge roller pairs 220A to 220E for a time corresponding to a distance obtained by adding the sheet length to the length in the sheet carrying direction of the drawer device 230. After Step S14 has been performed, the controller 110 ends the tearing jam releasing process.

In this way, when the sheet lengths of sheets P located in the tearing jam place of the drawer device 230 are greater than the predetermined length, all sheets P are discharged from the inside of the drawer device 230, and thus it is possible to reliably prevent a tearing jam of a sheet P2 from occurring with drawing-out of the drawer device 230.

In the first technique and the second technique, since a sensor for detecting whether there is a sheet located in a tearing jam place is separately provided, there is a problem in that costs for mounting such a sensor increases. Since a shelter part for taking shelter of a sheet or a locking mechanism, or the like is provided in order to prevent a tearing jam, there is a problem in that cost increases further.

On the other hand, according to the aforementioned embodiment, the controller 110 determines whether there is a sheet P located in a tearing jam place between the inside and the outside of the drawer device 230 at a time point at which a jam has occurred on the basis of the results of detection from the discharge sensor 19 and the bridge sensor 240 and performs the tearing jam releasing process for removing the sheet P from the tearing jam place when it is determined that there is the sheet P.

In this way, since whether there is a sheet located in the tearing jam place is determined using the results of detection from the discharge sensor 19 and the bridge sensor 240, it is possible to reduce the number of sensors in comparison with a case in which a sensor for detecting whether there is a sheet located in the tearing jam place is separately provided. As a result, it is possible to achieve a decrease in cost of products.

According to the aforementioned embodiment, the controller 110 determines whether there is an upstream sheet P1 and whether there is a downstream sheet P2 at a time point at which a jam occurs. Accordingly, it is possible to perform an appropriate tearing jam releasing process corresponding to a position of a sheet P located in the tearing jam place.

According to the aforementioned embodiment, the controller 110 performs the upstream sheet carrying process of Step S13 when the sheet length is equal to or less than the predetermined length and performs the total sheet discharging process of Step S14 when the length in the sheet carrying direction of the sheet is greater than the predetermined length. Accordingly, it is possible to perform an appropriate tearing jam releasing process corresponding to the sheet length.

According to the aforementioned embodiment, when the sheet length is equal to or less than the predetermined length, the controller 110 performs the downstream sheet discharging process of Step S12 before the upstream sheet carrying process is performed. Accordingly, even when an upstream sheet Pl and a downstream sheet P2 are located in the tearing jam places of the drawer device 230, it is possible to smoothly perform discharging of the downstream sheet P2 and carrying of the upstream sheet P1 to the staying position. As a result, it is possible to the upstream sheet P1 and the downstream sheet P2 from the tearing jam places without interfering with each other. It is possible to prevent a tearing jam without separately providing a mechanism for preventing a tearing jam.

Other Modified Examples

In the aforementioned embodiment, the controller 110 determines whether there is a downstream sheet P2 at a time point at which a jam occurs on the basis of the output of the bridge sensor 240, but the present disclosure is not limited to the embodiment. For example, the controller 110 may determine whether there is a downstream sheet P2 on the basis of the output of the discharge sensor 19.

In this case, the controller 110 measures the third elapsed time from a time point at which the output of the discharge sensor 19 is switched from the OFF signal to the ON signal. The controller 110 calculates the distance between the rear end in the sheet carrying direction of the sheet P for which the OFF signal and the ON signal are output from the discharge sensor 19 and the discharge sensor 19 at a time point at which a jam has been detected on the basis of the third elapsed time at the time point at which the jam has been detected and the predetermined carrying speed of the sheet P.

When the calculated distance is less than a distance from the discharge sensor 19 to the downstream end in the sheet carrying direction of the drawer device 230, the controller 110 determines that the rear end in the sheet carrying direction of the sheet P is located inside of the drawer device 230, that is, that a downstream sheet P2 is "present." When the calculated distance is equal to or greater than the distance, the controller 110 determines that a downstream sheet P2 is "not present."

In the aforementioned embodiment, the drawer device 230 provided in the relay carrying passage 210 is described as an example of the drawer device, but the present disclosure is not limited to the embodiment. The drawer device may be provided, for example, in the carrying passage 15 as long as it is provided in the sheet carrying passage along which a sheet is carried.

In the aforementioned embodiment, a digital multifunction machine is described as an example of the image forming apparatus 10, but the present disclosure is not limited to the embodiment. The image forming apparatus 10 may be, for example, another image forming apparatus such as a laser printer or an ink jet printer as long as it is an inner sheet discharge type image forming apparatus.

The configuration and the processes of the embodiment described above with reference to FIGS. 1 to 7 are only an embodiment of the present disclosure, and it is not intended to limit the present disclosure to the configuration and the processes.

While the present disclosure has been described in detail with reference to the embodiments thereof, it would be apparent to those skilled in the art the various changes and modifications may be made therein within the scope defined by the appended claims.

What is claimed is:

1. A sheet carrier device comprising:

a sheet carrying passage including a part configured as a drawable drawer device;

roller pairs carrying a sheet along the sheet carrying passage;

a sheet detection device detecting whether there is the sheet which is being carried along the sheet carrying passage; and a control device including a processor and, by causing the processor to execute a control program, determining whether there is the sheet located in a tearing jam place between the inside and the outside of the drawer device at a time point at which a jam occurs on the basis of a result of detection from the sheet detection device and performing a tearing jam releasing process of removing the sheet from the tearing jam place when it is determined that there is the sheet, wherein the sheet carrier device further comprises an upstream roller pair provided upstream in the sheet carrying direction and a downstream roller pair provided downstream in the sheet carrying direction as the roller pairs, the sheet detection device includes a first sensor provided upstream in the sheet carrying direction from the upstream roller pair and a second sensor provided in the vicinity of the downstream roller pair, and the control device:

(i) for each of the first sensor and the second sensor, measures a respective elapsed time from a point in time at which an output of the corresponding sensor changes in response to passage of the sheet;

(ii) based on each elapsed time and a predetermined sheet conveying speed, calculates a distance between the respective sensor and an end portion of the sheet corresponding to the respective sensor; and (iii) determines whether the sheet is located at the tearing jam place by comparing each calculated distance with a reference distance between the respective sensor and an end of the drawer device corresponding to the respective sensor.

2. The sheet carrier device according to claim 1, wherein the control device determines whether there is an upstream sheet suspended between an upstream end in a sheet carrying direction of the drawer device and the outside of the drawer device and whether there is a downstream sheet suspended between a downstream end in the sheet carrying direction of the drawer device and the outside of the drawer device at the time point at which a jam occurs.

3. A sheet carrier device comprising:

a sheet carrying passage including a part configured as a drawable drawer device;

roller pairs carrying a sheet along the sheet carrying passage;

a sheet detection device detecting whether there is the sheet which is being carried along the sheet carrying passage; and a control device including a processor and, by causing the processor to execute a control program, determining whether there is the sheet located in a tearing jam place between the inside and the outside of the drawer device at a time point at which a jam occurs on the basis of a result of detection from the sheet detection device and performing a tearing jam releasing process of removing the sheet from the tearing jam place when it is determined that there is the sheet, wherein the control device determines whether there is an upstream sheet suspended between an upstream end in a sheet carrying direction of the drawer device and the outside of the drawer device and whether there is a downstream sheet suspended between a downstream end in the sheet carrying direction of the drawer device and the outside of the drawer device at the time point at which a jam occurs, and the sheet carrier device further comprises an upstream roller pair provided upstream in the sheet carrying direction and a downstream roller pair provided downstream in the sheet carrying direction as the roller pairs, wherein the control device performs an upstream sheet carrying process of rotationally driving the upstream roller pair to carry the upstream sheet to a staying position at which the upstream sheet is able to stay in the drawer device such that the upstream sheet is not suspended between the inside and the outside of the drawer device as the tearing jam releasing process when a length in the sheet carrying direction of the sheet is equal to or less than a predetermined length which is less than a length in the sheet carrying direction of the drawer device, and wherein the control device preforms a total sheet discharging process of rotationally driving the upstream roller pair and the downstream roller pair to discharge all sheets staying in the drawer device from the inside of the drawer device as the tearing jam releasing process when the length in the sheet carrying direction of the sheet is greater than the predetermined length.

4. The sheet carrier device according to claim 3, wherein the control device performs a downstream sheet discharging process of rotationally driving the downstream roller pair to discharge the downstream sheet from the inside of the drawer device as the tearing jam releasing process before performing the upstream sheet carrying process when the length in the sheet carrying direction of the sheet is equal to or less than the predetermined length.

5. The sheet carrier device according to claim 3, wherein the sheet detection device includes a first sensor provided upstream in the sheet carrying direction from the upstream roller pair and a second sensor provided in the vicinity of the downstream roller pair, and wherein the control device determines whether there is the upstream sheet on the basis of a result of detection from the first sensor and determines whether there is the downstream sheet on the basis of a result of detection from the second sensor.

6. An image forming system comprising:

an image forming apparatus forming an image on a sheet;

a post-processing apparatus performing a post-process on the sheet; and the sheet carrier device according to claim 1 receiving the sheet from the image forming apparatus and carrying the sheet to the post-processing apparatus.

* * * * *